United States Patent [19]
Carstensen

[11] Patent Number: 5,845,945
[45] Date of Patent: Dec. 8, 1998

[54] TUBING INTERCONNECTION SYSTEM WITH DIFFERENT SIZE SNAP RING GROOVES

[76] Inventor: Kenneth J. Carstensen, 1860 Whiteoak Dr., Houston, Tex. 77009

[21] Appl. No.: 763,384

[22] Filed: Dec. 16, 1996

Related U.S. Application Data

[63] Continuation-in-part of Ser. No. 132,803, Oct. 7, 1993, Pat. No. 5,584,512.
[51] Int. Cl.$^6$ ............................................. F16L 39/00
[52] U.S. Cl. ................. 285/321; 285/332.2; 285/332.3; 285/334.3; 285/347; 285/348; 285/351; 285/369; 285/918; 277/626
[58] Field of Search .................................. 285/321, 349, 285/334.2, 348, 918, 347, 351, 369, 332.2, 332.3, 334.3; 277/619, 620, 621, 623, 624, 626, 531

[56] References Cited

U.S. PATENT DOCUMENTS 731,304  6/1903  Howe ..................................... 277/531
3,074,747  1/1963  Boughton ............................. 285/348 X
4,426,105  1/1984  Plaquin et al. ...................... 285/321 X
5,360,218  11/1994  Percebois et al. .................. 277/626 X

FOREIGN PATENT DOCUMENTS 542716  3/1957  Italy ....................................... 285/349

*Primary Examiner*—Dave W. Arola
*Attorney, Agent, or Firm*—Merchant, Gould, Smith, Edell, Welter & Schmidt

[57] ABSTRACT

A threadless interconnection system for sections of pipe as provided by a male/female interconnection in which the male member and female members have mating tapered surfaces providing both the camming action for inset snap rings that engage concurrently upon assembly of the interconnection. The tapered section includes angles which assure that snap rings are precentered within tolerances before being gradually opened during the assembly process, while also providing a metal-to-metal seal after assembly. Sealing is facilitated by composite seals that include O-rings arranged with compatible actuator and backup rings so as to avoid destruction of the O-ring geometry because of bending, flexure and torsional forces.

14 Claims, 5 Drawing Sheets

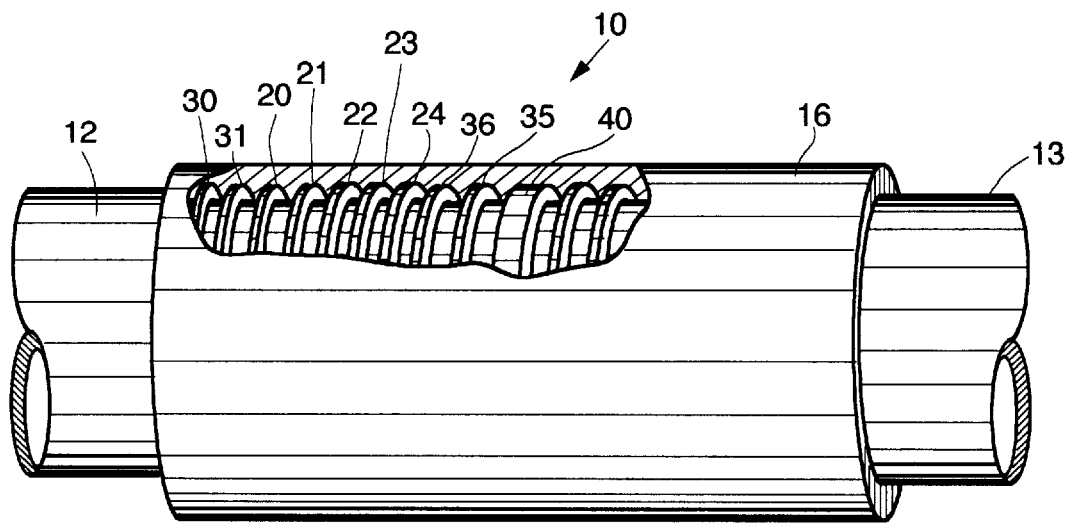
FIG. 1.
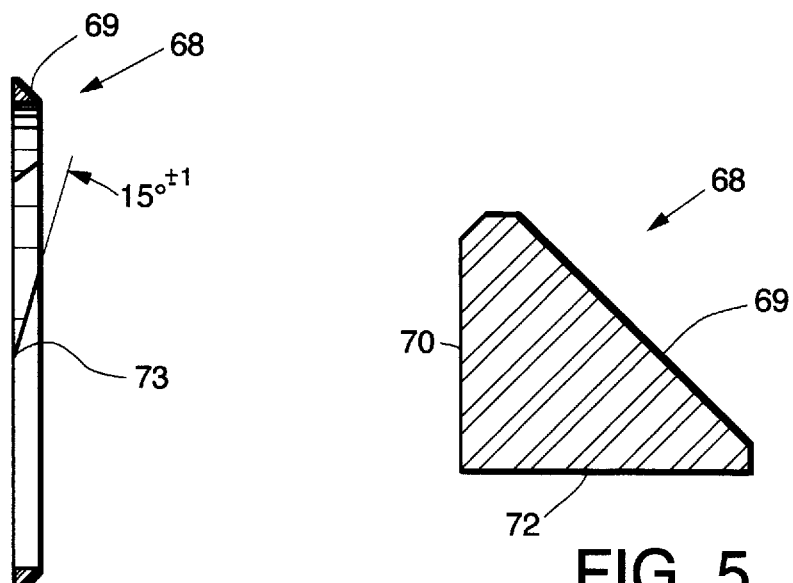
FIG. 4.
FIG. 5.

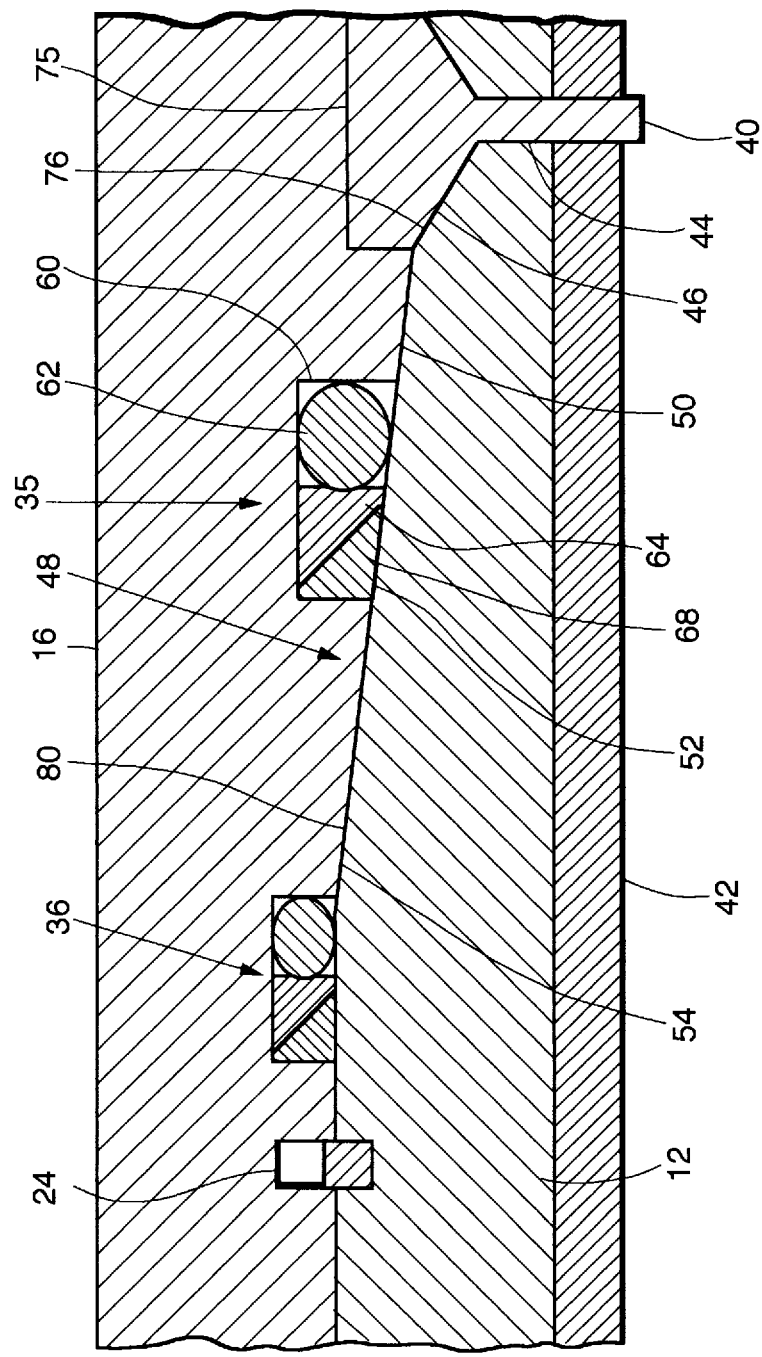

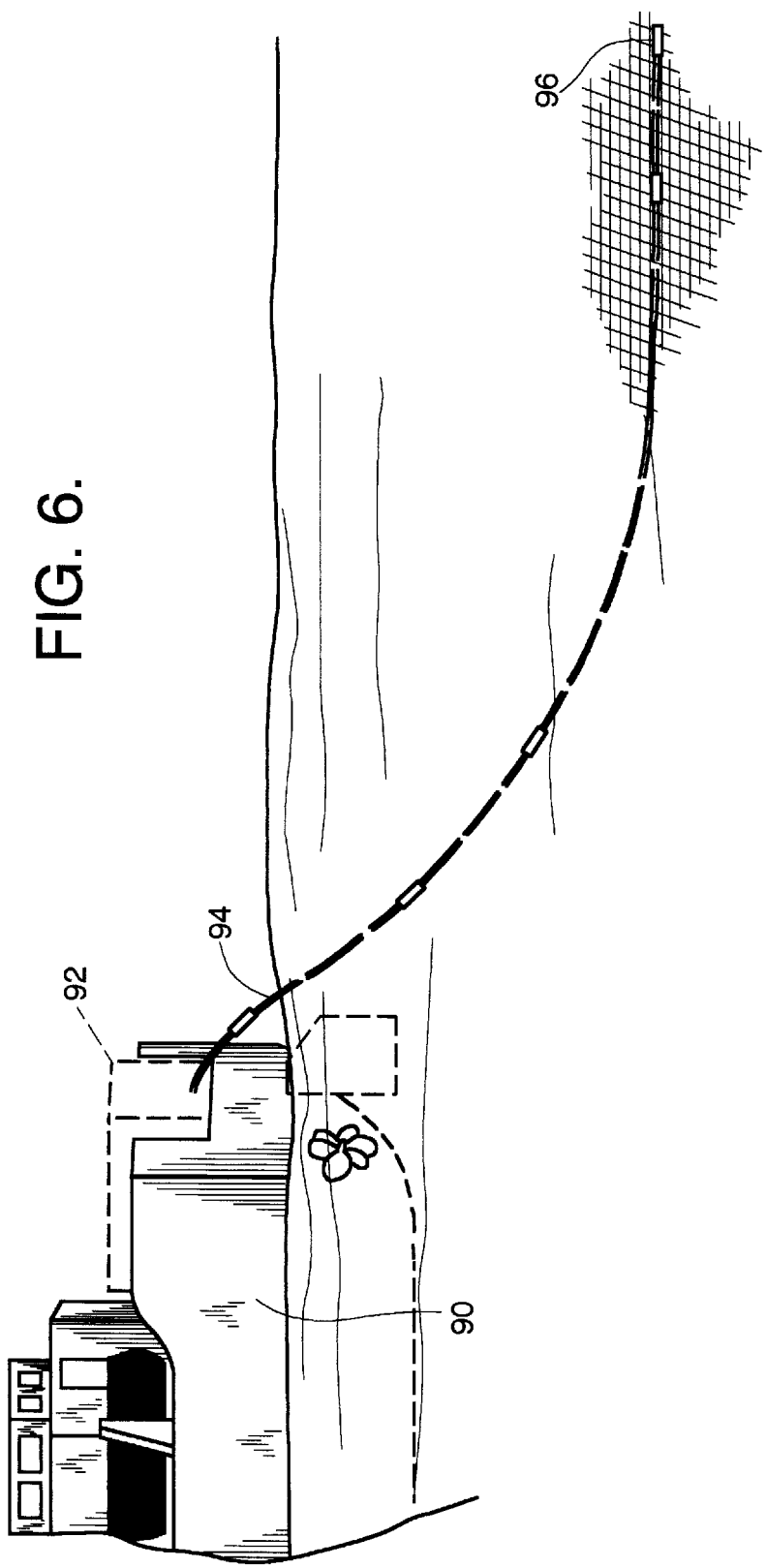

TUBING INTERCONNECTION SYSTEM WITH DIFFERENT SIZE SNAP RING GROOVES

RELATED APPLICATIONS

This application is a continuation-in-part of application Ser. No. 08/132,803, filed Oct. 7, 1993 now U.S. Pat. No. 5,584,512, issued Dec. 17, 1996.

BACKGROUND OF THE INVENTION

The parent application, referenced above, with respect to which the present application is a continuation-in-part, describes a novel and improved system for interconnecting unthreaded tubing, casing and pipe sections. The connection system uses an overlapping relationship between male and female pipes, provided by an exterior collar or upset pipe ends. A succession of paired and matching grooves are aligned when the overlapping sections are thus assembled, the grooves having different longitudinal lengths, being engaged by interior snap rings that prevent disengagement and maintain axial alignment under load. The length gradations of the snap rings and grooves are such that, when the pipe sections are slid together, with the snap rings mounted in the female element, the larger snap rings pass over the smaller grooves until they find the grooves into which they are designed to fit. All of the snap rings seat in place concurrently. When thus assembled, the connection has center seal rings that are under compression between the nose ends of the sections within a collar, for example. These seal rings ensure a flush interior surface, and, together with O-rings adjacent the snap ring locations seal against the loss of internal pressures.

This arrangement has proven to be advantageous for a number of vertical string and horizontal pipeline applications.

Where extremely long life has to be achieved, under stressful operating conditions, however, a number of other factors have to be taken into account. For example, even though the system includes pipe ends shaped to allow snap ring expansion as they ride over the surface of the male member, experience has shown that other problems can arise. For example, where heavy or a substantial number of snap rings are used, ring expansion to the needed inner diameter requires substantial force. In such expansion, the snap rings can scrape on and bite into the metal and the resultant imperfections tend to introduce leakage and pressure loss. Furthermore, some snap rings in the female member may be so much out of alignment, although still in the grooves, that they will not fit over the male member of the pair when it is being inserted. Using a precentering tool is a separate step which is time consuming and not necessarily fail-safe.

A significant advantage is derived, with unthreaded connections having adequate sealing properties, from the ease with which indefinitely long lengths of pipe can be laid down from a vessel. However, paying out a line of pipe from a vessel or other source introduces torsional, bending and flexure forces on the pipe and particularly on the connections. The new design has the benefit that a length of pipe can be twisted relative to its adjacent length without problem, since there is no tendency to tighten or loosen a threaded connection, and the pipe-to-pipe sealing contact remains secure even though one pipe may be angularly displaced relative to the other. However, the pipe cannot be precisely aligned either laterally or vertically when on the sea floor.

O-ring degradation has occurred, not only because of contact with surface scratches and imperfections induced by the frictional contact but also because of these pipe deformations. For example, under high temperature and/or high pressure, O-ring seals tend to extrude out of their associated grooves by a minute amount when the tubing bodies are flexed by some cyclic effect. The corner of the O-ring groove can sever a small segment of the O-ring when the unit is then flexed in the opposite direction. Given enough cycling of this kind, the O-ring is substantially diminished and effectively destroyed, substantially degrading the performance of the section in sealing against high internal pressures. Maintenance of the sealed condition, and improvement of it, when the connection is used under these conditions, is of significant importance.

SUMMARY OF THE INVENTION

In a pipeline connection system and method utilizing matching overlying sections having opposed graduated grooves with matching internal step rings, interior surfaces are provided to facilitate assembly and achieve both metal-to-metal and elastomeric element sealing capable of withstanding bending, flexure and torsional deformation. To this end, the male member received in a female member having preinserted snap rings includes a nose end region including an angled entry end and a ramp region transitioning to the snap ring length. The angled end engages misaligned snap rings to reorient them within a selected range of tolerance. The ramp section on the male member has a low angle relative to the longitudinal axis, and allows low force, low friction spreading of the snap rings until they are fully expanded. Upon full penetration of the male member to the selected depth, the opposed grooves in the male member and female member are aligned and the snap rings contract into position, locking the elements in place and absorbing axial and other loads. The female member incorporates a ramp surface complementary to and engaging the ramp surface on the male member, providing a metal-to-metal seal that enhances resistance to internal pressure. This arrangement is particularly suited for use with horizontal pipe systems, such as those that are laid out in a continuous string on the sea floor.

The male and female members may comprise tubing sections inserted from opposite directions into a collar, or successive upset pipe sections which use no collar. The ramp surfaces may be single or double, dependent upon the number, stiffness and size of the snap rings.

Further in accordance with the invention, sealing characteristics and operative life are improved by the incorporation in the ramp region of non-wedging O-ring devices using composite ring structures. The O-rings engage one sidewall of the groove, but also engage an intermediate actuator ring having a surface facing the O-ring that is concave for better registration and also physically compatible in nature. The opposite side of the actuator ring is angled to mate with a wedge ring of incompressible material, such as metal, that engages both the opposite sidewall of the groove and the facing surface of the male member. The engaging surfaces of the actuator ring and the wedge ring lie along a plane at a 45° angle relative to the longitudinal axis of the pipe. Consequently, deformation of the O-ring under pressure and loading forces is transmitted to the actuator and to the wedge ring, which acts with force components both against the sidewall and the opposed tubing section. The wedge ring is circumferentially deformable because it is split at an angled sliding surface which allows response under bending and flexure forces.

An example of a system in accordance with the invention is a 4½" pipe for sea floor applications, in which unthreaded connections are utilized. A collar is joined to each pipe end by five interposed snap rings in this example. The pipe has two ramp sections with surfaces at low angles, and the collar incorporates two non-extruding O-ring structures as described. In addition, O-rings are disposed in the collar adjacent each end for sealing the connection for exterior pressurized fluid. At the nose ends of the tubing, the interposed central seal is a Teflon™ element, having a profile mating, under compression, with the end profile of the pipe.

BRIEF DESCRIPTION OF THE DRAWINGS

A better understanding of the invention may be had by reference to the following description, taken in conjunction with the accompanying drawings, in which:

FIG. 1 is a perspective view, partially broken away, of a connection employing two pipes fitting within a collar, in accordance with the invention;

FIG. 3 is an enlarged side sectional view of the portion of the view of FIG. 2;

FIG. 4 is a side view of a wedge ring that is employed in the connection of FIGS. 1–3;

FIG. 5 is a cross-sectional view of the ring of FIG. 4;

FIG. 6 is a simplified view of an operation for laying pipe on a sea floor; and

DETAILED DESCRIPTION OF THE INVENTION

Figure 2:
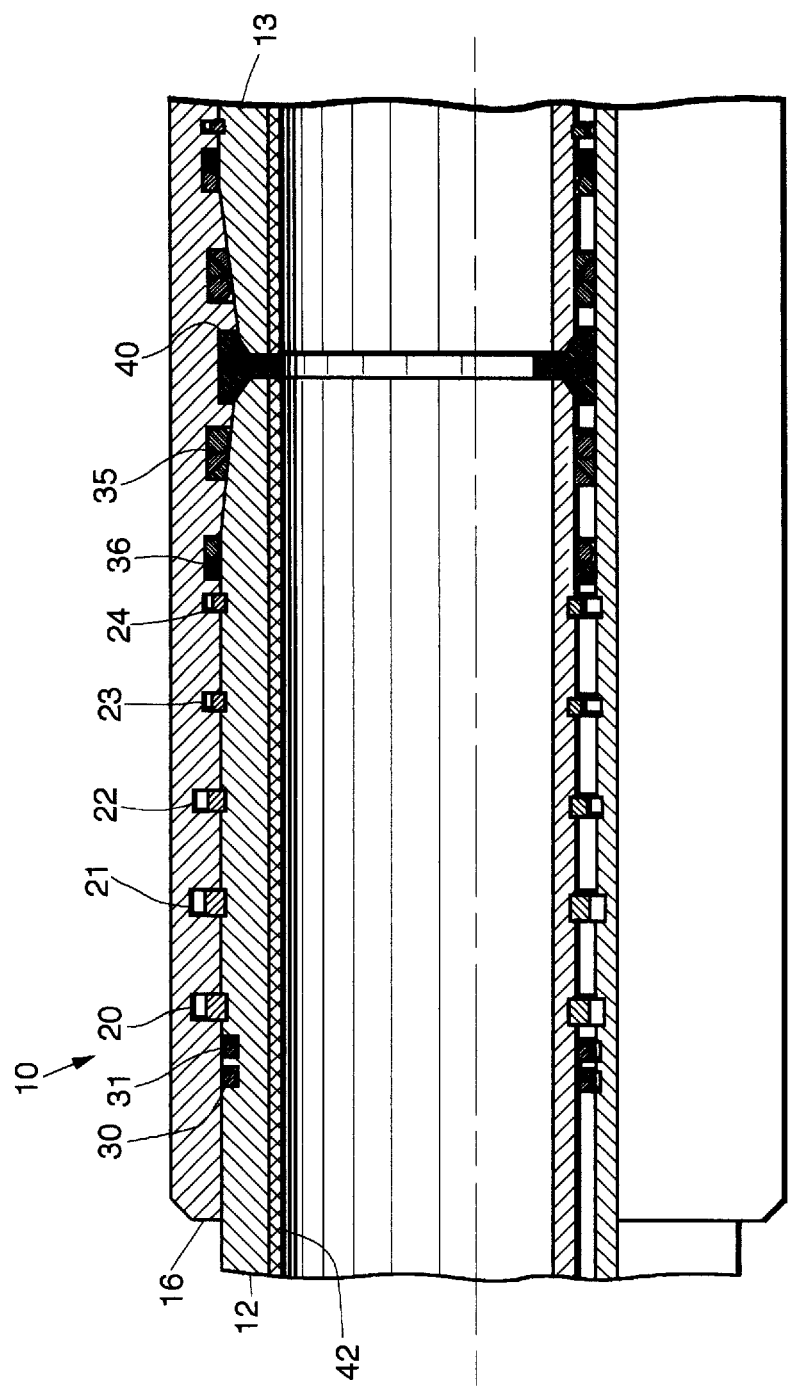
FIG. 2 is a side sectional view of the arrangement of FIG. 1.

A connection or coupling system 10 in accordance with the invention for coupling the ends of pipe, such as tubings or casings for the petroleum industry, and pipe for a variety of other applications is shown in general form in FIG. 1. This specific example demonstrates application of the invention to a typical 4½" pipe, with 0.437 wall thickness. The pipe sections, generally called pins, are first and second male members 12, 13 fitted into the opposite ends of a collar 16 having interior circumferential grooves on each side. These receive expandable snap rings having graduated axial dimensions, as set forth in the parent application. Here, the tubing system is to withstand substantial forces, so five successively narrower snap rings, 20–24 inclusive, as viewed from left to right starting at the left end of the collar 16 in FIG. 1 are installed. When the pin 12 is inserted in the collar 16, all rings 20–24 seat concurrently when the assembled position is reached, in which the circumferential grooves on the pin 12 and the collar 16 are in alignment. As discussed more fully in the parent application, axial loads can thereafter be taken up in the snap rings, which have greater structural strength than the pipe walls themselves.

The pin 12 also includes first and second O-rings 30, 31 engaging the collar 16 progressively inboard from the open end of the collar 16. The collar includes first and second grooves receiving anti-extrusion seals 35, 36 between the snap rings 24, and the nose end of the pin 12, the first such seal 35 being that closest to the nose end. At the second pin 13, the snap rings, O-rings and anti-extrusion seals are disposed in mirror image relation to the collar 16 and function in the same way, making the complete connection shown in FIG. 1. When thus assembled, the nose ends of the pins 12, 13 engage the opposite sides of a center seal 40 seated in the collar 16.

This arrangement and other features are shown in greater detail in FIGS. 2 and 3, to which reference is also made. The small O-rings 30, 31 between the first snap ring 20 and the end of the collar 16 in the first pin 12, do not reduce wall strength, since the grooves for the O-rings are of less depth than the grooves for the snap rings. The interior wall of the pin 12 also is covered by a fiberglass liner 42, the interior surface of which is flush with the interior edge of the center ring 40. The second pin 13 which also abuts against the opposite side of the center seal 40, also has a fiberglass liner which is not shown to depict the alternate usage of an unlined pipe system. The arrangement of surfaces and seals that follows will be described only for the first pin 12 and will be understood to be applicable to the second pin 13 as well.

The transverse nose end 44 of the first pin transitions to a short tapered section 46, here at a 30° angle relative to the longitudinal axis of the pin 12. The corner between the nose end 44 and the 30° taper 46 is at a diameter which is smaller than the maximum offset of an unexpanded snap ring 20–24. Thus during assembly a snap ring that is securely in its groove in the collar but offset by a maximum physically permissible amount will not engage the flat portion of the nose end 44. If this were to happen, substantial force would have to be exerted, with the possibility of deformation or abrasion of one or both of the contacting surfaces. While it is feasible to precenter the snap rings, this can be time consuming and subject to error. In any event, the 30° taper section 46 eliminates the need for preliminary snap ring adjustments. Proceeding from the 30° taper section 46 in the direction away from the nose end, the surface profile of the pin 12 is selectively shaped to include a ramp section 48 to the constant diameter region that provides both a camming and a sealing function. Here the ramp section 48 includes a first ramp 50 (closest to the nose end) at a low angle (approximately 8°) relative to the longitudinal pipe axis. This first ramp 50 is separated by a short constant diameter section 52 from a second ramp 54 of like 8° angle. The second ramp 52 transitions to the constant diameter section of the pin 12.

In the ramp region 48 of the collar, a first approximately rectangular circumferential groove 60 having transverse sidewalls and a substantial axial dimension is provided to receive a first anti-extrusion seal device 35. The seal 35 comprises an O-ring 62 adjacent the groove end wall closest to the pin nose end, an actuator ring 64 having a concave face 65 in abutment against the O-ring 62 and a 45° angle face 66 on the opposite side from the O-ring 62. The face 66 engages complementary face 69 on a steel wedge ring 68 having an end wall face 70 engaging the adjacent sidewall of the groove 60, and an inner face 72 engaging the opposed surface of the pin 12. The O-ring 62, in this example, is of ³⁄₁₆ diameter in the uncompressed condition (shown in dotted lines), the actuator ring 64 is of a 25% fiberglass filled Teflon™, and the steel wedge ring 68 includes a circumferential separation 73 formed by an angled cut at approximately a 15° angle to a tangent to the circumference. These features of the wedge ring 68 are better seen in the separate views of FIGS. 4 and 5.

At the second anti-extrusion seal 36, the combination of ring elements is employed with the same placements, but with smaller sizes. The O-ring is ⅛ inch in diameter and the actuator and wedge rings are similarly smaller to fit in the lower depth groove which receives them.

At the nose end of the pins, the center seal ring 40 has a generally T-shaped configuration, fitting within a groove 75 in the collar, and having a side face 76 on the seal 40 to mate with the 30° taper 46 and the nose end 44 on the pin 12.

The collar 16 has a surface profile from its minimum inner diameter at the groove 75, to the constant diameter section containing the snap rings that is complementary to and mates with the ramp section 48 on the pin 12.

The advantages and benefits of using the structure of FIGS. 1–5 can be appreciated in terms of the conditions imposed by a typical deep sea installation, as shown in FIG. 6. Here a vessel 90 for pipe laying operations has an assembly area 92 typically in its stern region, and often, if not usually, at sea level, for feeding out a pipe string 94 that is to lie along a selected path on the sea floor 96. As the sections of the pipe string 94 are added and paid out, they are bent, flexed and subjected to torsional strains which must be resisted or compensated for by the connections. Stresses are also introduced by internal pressure variations within the pipe string 94, by wave action, by sea floor irregularities and by the occasional necessity for taking up pipe for repair, replacement or repositioning.

As the pipe string 94 is assembled, with lengths in end-to-end relation, referring again to FIGS. 1–5, the snap rings in the collar 16, if misaligned radially to the maximum direction, are readily repositioned by the 30° taper 46 on the nose end 44 as the pin 12 is inserted. Thereafter, the snap rings 20–24, the inner surfaces of which, in their unexpanded condition, are smaller than the outer diameter of the pin 12, must be further expanded outwardly. The snap rings 20–24, which are of high strength steel, can require considerable force to be expanded outwardly, the force needed varying with the snap ring axial length. Thus, the first snap ring 20 that is encountered by the pin during insertion is axially longest, and stiffest, and the low angle camming surfaces provided by the successive ramps 50, 54 reduce both the amount of assembly force required and the danger of scratching, abrasion or deformation of the surfaces. This is also important because of the metal-to-metal seal that is established between the ramp section 48 on the pin and the mating surface 80 on the collar when the final assembly position is reached.

At this position, as best seen in FIG. 3, the anti-extrusion seals 35, 36 engage both angled and constant diameter surfaces on the pin 12. The actuator rings 64 and the steel wedge rings 68 are facing the constant diameter segments and the O-rings 62 engage the angled ramp surfaces 50 and 54. With O-rings 62 that are sized to compress within their portion of the grooves, force is exerted on the actuator ring 64 in the direction away from the nose end 44 and the 45° angled surfaces generate a force vector at the steel wedge ring 68 both on the end wall of the grooves, and against the opposed pin 12. With this arrangement, torsional, bending and flexure forces acting on the connection do not extrude an O-ring outside the groove, even though pressure and temperature may reach a high level and reduce the elastomeric hardness characteristic of the O-ring. This is due in part to the geometry of the O-ring within its groove, since the taper of the pin 12 introduces a larger space at the nose end corner, beyond which the O-ring is unlikely to extrude. It is also due to the circumferential adjustability of the steel wedge ring 68, since the split faces at the 15° angle separation 73 in the circumference are free to shift relatively under both expansive and compressive forces, while the axial forces are constantly transmitted between the O-ring 62 and the steel wedge ring 68 by the intermediate actuator ring 64. Because of the radially inward force vector on the steel wedge ring 68, there is a highly loaded contact pressure between the inner face 72 of the wedge ring and the outer diameter of the pin 12. This loading eliminates any clearance between the collar 16 and pin 12 due to manufacturing tolerances or other reasons. At the same time, the configuration maintains clearances for the O-ring 62 such that the elastomer cannot extrude to edges where a segment might be abraded or severed.

As a result, the multiple-element anti-extrusion seal structure provided by this system is resistant to the very critical conditions existing during the continuous laying of a pipe string on the sea floor and the ensuing operations and conditions. The nose ends of the pins compress the center seal 40, thus resisting high interior pressures at the access points, while the metal-to-metal seal at the tapered surfaces further attenuates any leakage flow, and the O-rings and steel wedge rings complete the sealing action.

The O-rings 30, 31 in the pipe 12 adjacent the open end of the collar 16 oppose the possible intrusion of sea water into the interior of the connection.

Figure 7:
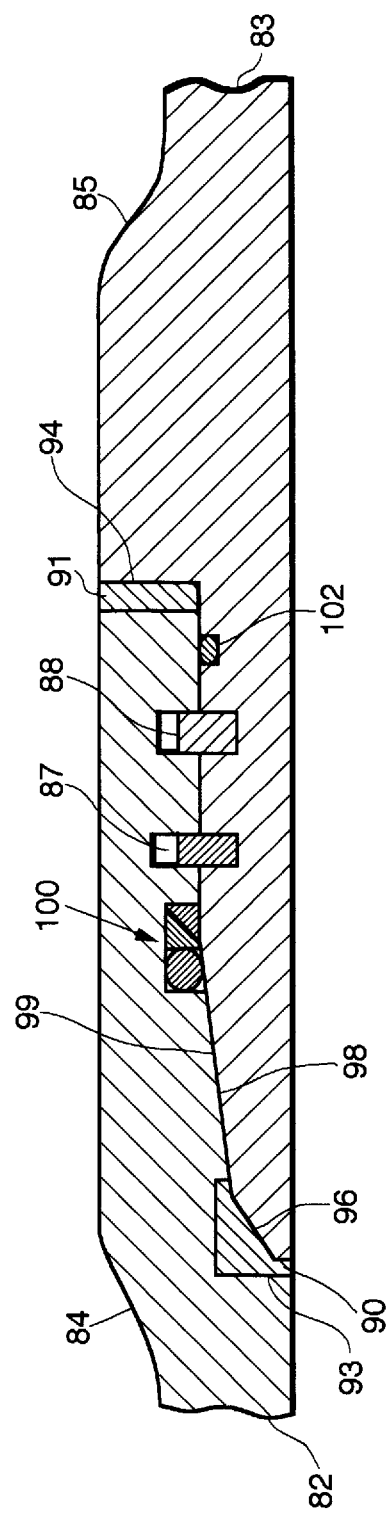
FIG. 7 is a side view of a connection in which the male and female members are formed by upset pipe sections.

FIG. 7 depicts application of the concepts to a pipe connection between male and female segments in which the overlap region is defined by expanded or upset portions 84, 85 at the ends of two pipes 82, 83. Here, two snap rings 87, 88 of different lengths are disposed in grooves in a constant diameter mating section, as previously described in the parent application. End seals 90 and 91 are interposed at each end between the nose end of the members and an opposed shoulders 93, 94 on the opposite ends of the upset portions 84, 85. The second pipe 83 is the male member for the connection in the second pipe 83, and the snap rings 87, 88 in the female member or first pipe 82 must expand when the second pipe 83 is inserted. The second pipe 83 has a slanted precentering face 96 at its nose end, and the seal 90 which it engages has a mating slanted surface. Between the precentering face 96 and the first snap ring 87 is a low angle ramp section 98 in the second pipe 83, matched by an engaging ramp 99 on the first pipe 82, to provide a metal-to-metal seal on assembly.

The low force camming action on the snap rings 87, 88 during engagement (and after precentering) and the metal-to-metal seal are thus provided as in the prior example. At the transition region between the ramp 99 and the constant diameter section of the first pipe 82 is included a multi-element anti-extrusion seal 100, while an O-ring 102 in the second pipe is provided at the opposite side of the snap rings 87, 88. With lower force and pressures being assumed for this example, only one ramp 98, two snap rings 87, 88 and one anti-extrusion seal 100 will suffice.

The described usage of the connections in accordance with the invention is merely to depict how they can be employed in a particularly demanding application. The same connections also have widespread relevance to horizontal and other orientation installations in above ground, surface and subsurface locations.

Although there have been described above and illustrated in the drawings various forms and modifications in accordance with the invention, it will be understood that the invention is not limited thereto but encompasses all alternatives and other expedients within the scope of the appended claims.

In the claims:

1. In a tubing connection system wherein the connection comprises an interconnecting outer collar about a pair of unthreaded tubing section ends, the collar and tubing when assembled having contiguous overlapping lengths that include a number of matching circumferential grooves forming opposing groove pairs on assembly, and a number of circumferential snap rings, each disposed in a different one of the matching groove pairs and having inner and outer circumferential surfaces, the combination comprising:

a nose end angled section on the outer side of each tubing section, the angle starting from the nose end at a radial position that is within the inner circumferential surface of a snap ring displaced to its maximum extent in the collar;

an outer ramp section on each tubing section disposed between the nose end angled section and the closest adjacent matching groove of the tubing section and providing a low angle transition therebetween; and an inner length of the collar having a ramp section mating with and engaging the ramp section of the tubing to provide metal-to-metal contact when the connection is assembled.

2. A combination as set forth in claim 1 above, wherein the nose end angled section and ramp section form a continuous transition for expanding the snap rings with low force during engagement and wherein the combination further includes seal means disposed between the ramp section and the snap rings and including at least one circumferential groove and a circumferential variable incompressible element.

3. A combination as set forth in claim 2 above, wherein the seal means comprises means defining a substantially rectangular cross-section groove in the collar, an O-ring disposed in the groove on the side adjacent the nose end of the tubing, a metal backup ring disposed in the groove on the opposite side from the O-ring and engaging the sidewall of the groove thereat, and an actuator ring disposed between the backup ring and the O-ring, the backup ring being of incompressible material and the actuator ring being of a material having a non-abrasive action on the O-ring.

4. The combination as set forth in claim 3 above, wherein the ramp section comprises a pair of separate low-angled ramp sections disposed successively further away from the nose end and separated by a length of constant diameter tubing, and the seal means comprises a pair of O-ring devices of successively smaller size, each having the O-rings in contact with the ramp surfaces and actuator and backup rings in contact with the constant diameter sections, and wherein the combination further comprises at least one O-ring disposed in each end of the collar between the last snap ring adjacent that end of the collar and the end of the collar.

5. A combination as set forth in claim 4 above, wherein there are at least four matching and opposed grooves in each of the collar and tubing sections and snap rings disposed therein, and wherein the grooves and snap rings along the tubing and collar from the nose end of the collar are of successively longer length along the longitudinal axis of the connection.

6. A combination as set forth in claim 1, wherein the tubing sections have a spacing between the nose ends when the connection is assembled, wherein the collar includes a circumferential groove in the central region adjacent the nose ends, and wherein the combination further includes an elastomeric seal member disposed in the central circumferential groove of the collar and configured to be engaged by the nose ends and the nose end angled sections of the tubing when the combination is assembled.

7. An O-ring combination for sealing against fluid flow between two engaging concentric surfaces, one of which has an internal concentric groove having substantially parallel sidewalls, comprising:

an elastomeric O-ring disposed in the groove against one of the sidewalls, and having a diameter sufficient to provide ring compression against the opposite engaging surface;

an actuator ring of non-metallic material having a face engaging the interior surface of the O-ring in the groove, the actuator ring having an angled face on the side opposite the O-ring; and a backup ring of incompressible material disposed between the actuator ring and the second of the sidewalls, the backup ring having an end face engaging the second sidewall and an angled opposite face engaging the angled face of the actuator ring in mating relation, the backup ring including an angled circumferential separation.

8. A combination as set forth in claim 7, wherein the backup ring is of steel and the actuator ring is of fiber-reinforced resin, and the angled faces of the actuator ring and backup ring that are in engagement lie along a plane that is at a 45° angle relative to the sidewalls of the groove.

9. The combination as set forth in claim 8 above, wherein the actuator ring has a concave surface in engagement with the O-ring, and wherein the circumferential separation in the backup ring lies along a plane through the backup ring at approximately a 15° angle to a tangent to the circumference of the backup ring, to permit circumferential deformation of the backup ring when the engaging surfaces are subjected to forces of deformation.

10. A system having a plurality of sections of unthreaded, interconnected pipe, comprising:

a plurality of collar sections interconnecting adjacent opposing ends of successive pipe sections, wherein the pipe sections and collar sections have constant diameter opposing surfaces including a series of spaced apart matching grooves and inserted expandable rings interposed in both matching grooves along the constant diameter sections, the pipe sections tapering at a low angle nose end having precentering angles for the expandable rings;

O-ring seal means disposed in the pipe sections between each outside end of the collar and the closest adjacent expandable ring in the series in each pipe section;

multi-element seal means disposed in the collar between the nose end of each pipe section and the closest adjacent expandable ring for that pipe section; and the collars and pipe sections having mating ramp sections providing metal-to-metal contact between the nose ends of the pipe sections and the expandable rings.

11. A combination as set forth in claim 10 above, wherein the multi-element seal means include O-rings and means for restricting movement of the O-rings outside the grooves in response to flexure, bending and torsion of the pipe sections.

12. An unthreaded, non-welded connection for tubing sections comprising:

a female member having an interior surface including a substantially constant interior diameter length including at least two circumferential grooves of differing axial length and different snap rings disposed therein having axial lengths fitting within the associated grooves but not smaller grooves;

a male member fitting within the female member and having a constant exterior diameter length mating with the substantially constant interior length of the female member at full insertion and including circumferential grooves matching the grooves in the female member and receiving the snap rings at full insertion, the male member having a nose end with a comer diameter fitting within the inner opening of snap rings received in the female member grooves regardless of off-center positioning, and a ramp section from the nose end to the constant diameter region;

the female member including an inner surface defining a ramp section opposed to and engaging the ramp section of the male member at full insertion to provide metal-to-metal contact; and at least one multi-element O-ring device disposed in the female member inner surface in association with the ramp section, the O-ring device comprising a circumferential groove in the female member and an O-ring, intermediate ring and backup ring disposed side-by-side in the groove.

13. A connection as set forth in claim 12 above, wherein the female member comprises a collar and the male member comprises a tubing, there being a pair of tubings inserted in opposite ends of the collar, and wherein the connection includes a center seal in the collar extending between and engaging the ends of the inserted tubings.

14. A connection as set forth in claim 12 above, wherein the female and male members comprise upset ends on adjacent tubing sections fitting together in mating relation, wherein the tubing section for the female member has an internal shoulder and the tubing section for the male member has an external shoulder, and the ends of the members are adjacent to the shoulder of the other member when the connection is in the fully inserted position and wherein the connection includes seals between the member ends and the opposing shoulder.

* * * * *